United States Patent
Schlagel et al.

(10) Patent No.: US 6,494,021 B1
(45) Date of Patent: Dec. 17, 2002

(54) CONTACT LENS TRANSFER AND MATERIAL REMOVAL SYSTEM

(75) Inventors: Mark E. Schlagel, Jacksonville; David C. Byram, Palm Coast, both of FL (US); Darren S. Keene, San Jose, CA (US)

(73) Assignee: Johnson & Johnson Vision Care, Inc., Jacksonville, FL (US)

(*) Notice: Subject to any disclaimer, the term of this patent is extended or adjusted under 35 U.S.C. 154(b) by 0 days.

(21) Appl. No.: 09/252,287

(22) Filed: Feb. 18, 1999

(51) Int. Cl.$^7$ .............................. B65B 31/04; B65B 5/04
(52) U.S. Cl. .............................. 53/432; 53/473; 53/510; 53/244; 53/254; 294/1.2; 294/64.1
(58) Field of Search ........................ 53/167, 251, 244, 53/246, 247, 254, 473; 134/DIG. 901; 294/1.2, 64.1

(56) References Cited

U.S. PATENT DOCUMENTS

| | | | |
|---|---|---|---|
| 4,495,313 A | 1/1985 | Larsen | 523/106 |
| 4,640,489 A | 2/1987 | Larsen | 249/122 |
| 4,680,336 A | 7/1987 | Larsen et al. | 524/548 |
| 4,761,069 A | 8/1988 | Truong et al. | 351/160 H |
| 4,782,946 A | 11/1988 | Pollak | 206/223 |
| 4,858,975 A * | 8/1989 | Ogawa | 294/64.1 |
| 4,889,664 A | 12/1989 | Kindt-Larsen et al. | 264/2.6 |
| 4,961,820 A | 10/1990 | Shinagawa et al. | 156/643 |
| 5,039,459 A | 8/1991 | Kindt-Larsen et al. | 264/2.6 |
| 5,080,839 A | 1/1992 | Kindt-Larsen | 264/2.6 |
| 5,094,609 A | 3/1992 | Kindt-Larsen | 425/445 |
| 5,476,111 A | 12/1995 | Andersen et al. | 134/58 |
| 5,490,959 A | 2/1996 | Nunez et al. | 264/2.6 |
| 5,528,878 A | 6/1996 | Edwards et al. | 53/54 |
| 5,561,970 A | 10/1996 | Edie et al. | 53/473 |
| 5,568,715 A | 10/1996 | Ebel et al. | 53/54 |
| 5,572,785 A * | 11/1996 | Tveit | 294/64.1 |
| 5,578,331 A | 11/1996 | Martin et al. | 425/445 |
| 5,616,184 A * | 4/1997 | Duncan et al. | 134/901 |
| 5,626,000 A | 5/1997 | Edwards et al. | 53/281 |
| 5,640,980 A | 6/1997 | Keene et al. | 134/58 R |
| 5,649,410 A | 7/1997 | Martin et al. | 53/474 |
| 5,675,962 A | 10/1997 | Martin et al. | 53/445 |
| 5,687,541 A | 11/1997 | Martin et al. | 53/54 |
| 5,690,866 A | 11/1997 | Andersen et al. | 264/2.6 |
| 5,690,973 A | 11/1997 | Kindt-Larsen et al. | 425/436 |
| 5,698,047 A | 12/1997 | Keene et al. | 134/22.18 |
| 5,706,634 A | 1/1998 | Edwards et al. | 53/473 |
| 5,749,205 A | 5/1998 | Edwards et al. | 53/542 |
| 5,762,081 A | 6/1998 | Keene et al. | 134/59 |

FOREIGN PATENT DOCUMENTS

| | | | | |
|---|---|---|---|---|
| WO | WO 96/24074 | 8/1996 | | G02B/1/04 |
| WO | WO 98/42497 | 10/1998 | | B29D/11/00 |

* cited by examiner

*Primary Examiner*—John Sipos
(74) *Attorney, Agent, or Firm*—Anne B. Kierman

(57) ABSTRACT

A method and apparatus for transferring a wet object, such as a contact lens, from a first station to a second station includes a probe having a barrel with a passage for communication with a vacuum source and a pressurized gas source, a nozzle at the end of the passage, and a hood around the nozzle in communication with a vacuum source. The barrel is moved in a first direction to place the nozzle adjacent the object in the first station and the vacuum from the nozzle attaches the object to the nozzle. Moving the barrel in a second direction removes the nozzle with the object attached from the first station. The probe is moved to the second station with the object attached. The barrel is moved in the first direction to place the object at the second station, the vacuum is removed from the nozzle and pressurized gas is applied through the barrel passage to remove the object from the nozzle and deposit it at the second station and, at the same time, blow off matter from the object. Vacuum is applied to the hood when the probe is at the second station for the hood to collect the matter blown the object by the compressed gas.

19 Claims, 4 Drawing Sheets

FIG. 1B
FIG. 1A
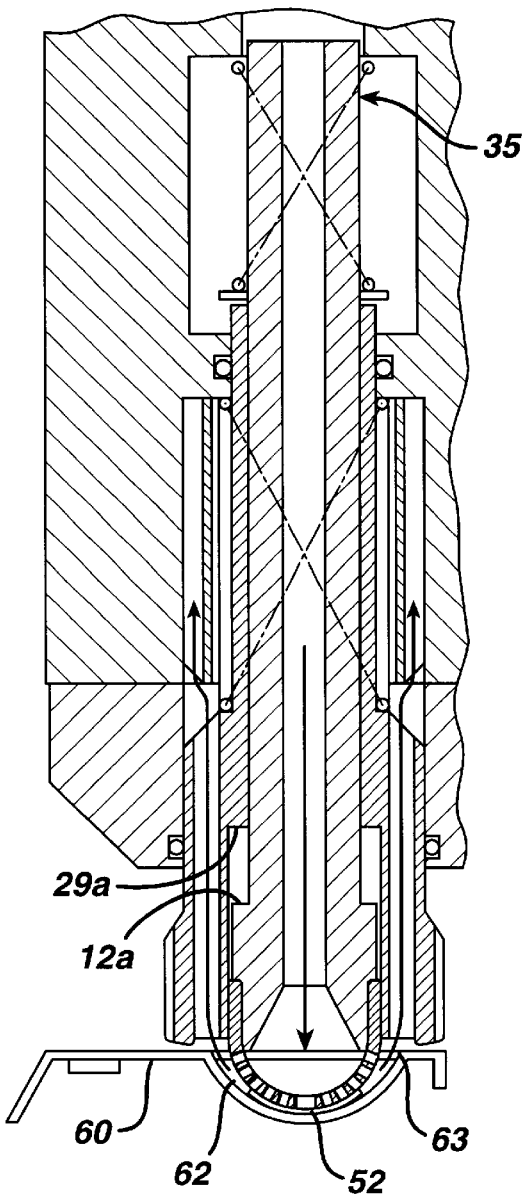
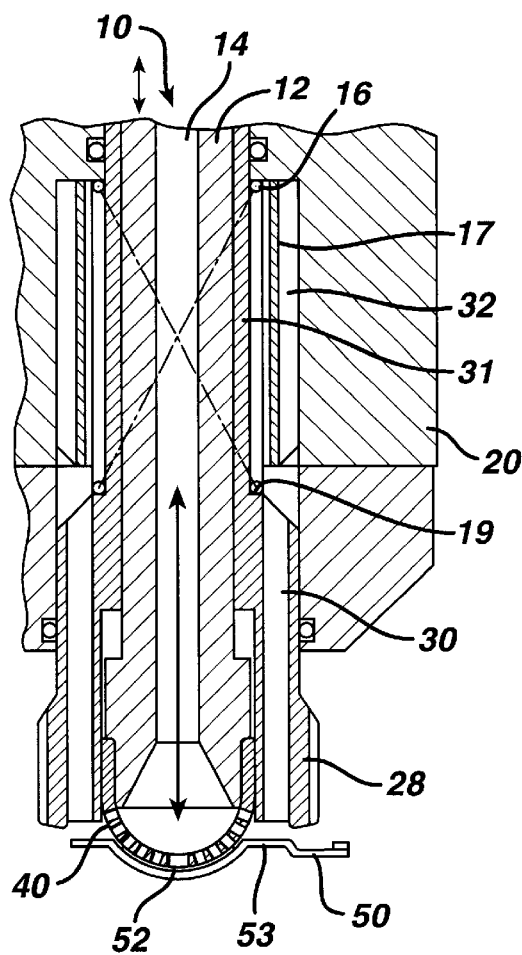

CONTACT LENS TRANSFER AND MATERIAL REMOVAL SYSTEM

FIELD OF THE INVENTION

The present invention relates to a method and apparatus for transferring wet plastic objects, such as contact lenses, from one station to another.

BACKGROUND OF THE INVENTION

The molding of hydrophilic contact lenses is known. Various processes are disclosed in U.S. Pat. No. 4,495,313 to Larsen; U.S. Pat. No. 4,640,489 to Larsen, et al.; U.S. Pat. No. 4,680,336 to Larsen et al.; U.S. Pat. No. 4,889,664 to Larsen et al.; and U.S. Pat. No. 5,039,459 to Larsen et al., all of which are assigned to the assignee of the present invention.

These prior art references disclose a contact lens production process wherein each lens is formed by molding a reactive mixture between a front curve (lower mold section) and back curve (upper mold section). Typically, the lenses are carried in a mold array or pallet, such as a two-by-four array. While in between the front and back curves, the monomer is polymerized to form the lens. In one type of process, the lens is removed from the front curve mold during a hydration step and then washed by the application of a hydrating deionized (DI) water to remove processing chemicals, e.g. diluents, from the lens.

Sometimes, when deionized water is used in the hydration, the final step of the process is to introduce a buffered saline solution into the final package holding the lens, and then seal the lens within the package so that the final lens equilibrium (ionic neutralization, final hydration and final lens dimensioning) is accomplished in the package at room temperature or during sterilization. U.S. Pat. No. 4,961,820, also assigned to the assignee of the present invention, discloses a final package for a contact lens, wherein the package is formed from a transparent plastic material such as polypropylene and a foil laminate that is heat sealed thereto.

The transfer of soft contact lenses during manufacture has been a significant problem. The lenses are small, are nearly invisible and are particularly hard to handle when immersed in the fluids commonly used in the manufacturing process. Accurate and reliable transfer of the wet lenses from one location to another or to a final package is often necessary during the manufacturing process.

As apparent from the foregoing, a need exists for an apparatus to transfer wet lenses from one station, such as a mold or hydrating bath, to another station, such as a package, and at the same time to remove or reduce the amount of the hydrating liquid and other material present on the lens from the hydrating process.

U.S. Pat. No. 5,578,331, entitled "Automated Apparatus and Method for Preparing Contact Lenses for Inspection and Packaging", also assigned to the assignee of the present invention, discloses a robotic arm for transferring a plurality of soft contact lenses from a first processing station to a second processing station. The robotic device includes an adjustable array of convex contact lens carriers. The specification of U.S. Pat. No. 5,578,331 is herein incorporated by reference.

U.S. Pat. No. 5,561,970, which also is owned by the assignee of this application, discloses an automatic contact lens transfer system, comprising robotic arms to contact and transfer soft contact lenses. The '970 patent is hereby incorporated by reference. U.S. Pat. No. 5,706,634, which also is owned by the assignee of this application, discloses a contact lens transfer device which comprises a convex lens transfer surface onto which the lens is secured via surface tension. The device then transports the lens to a second location. The lens is removed from the convex lens transfer surface when an amount of deionized water is ejected from the device. The '634 patent is hereby incorporated by reference. However, neither of these patents teach the removal of the hydrating solution or other matter, nor are they capable of performing the function of transfer and controlled matter removal. In addition, prior contact lens transfer systems fail to address splatter of liquid from a lens onto the packaging during lens transfer.

BRIEF SUMMARY OF THE INVENTION

The invention is concerned with the withdrawal of excess or foreign matter from a wet object, such as a contact lens, and/or its packaging prior to being sealed in a package. In preferred embodiments, this is achieved by providing a hood around a probe which is used to pick up and later release the wet object. The probe preferably handles the wet object using positive and negative pressure. The hood encompassing the probe creates suction to control matter during deposition and matter withdrawal or removal.

In one respect, the invention is directed to a method and apparatus for transferring a wet object, such as a contact lens, during and between various steps of manufacture and packaging. One set of these manufacturing steps is disclosed in U.S. Ser. No. 09/252,307, filed herewith in which transfer is necessary from a station at which washing and hydration of the lens takes place, in a front curve mold, to a final package designed for customer use. Alternatively, this apparatus could be used to transfer a lens from a reusable mold to a contact lens package, or from a mold to a container for inspection of the contact lens, or from any other first position to a second position.

In a preferred embodiment, the invention comprises a probe with a perforated hemispherical nozzle head having a diameter and shape corresponding to the contact lens shape. The probe is moved into close proximity, and more preferably into contact with the lens' concave surface while in a carrier or holder, such as a front curve mold, and picks up the contact lens from the holder by vacuum force, which creates suction at the nozzle which draws the lens from the holder onto the probe hemispherical nozzle.

A hood assembly encompasses the lower end of the probe and is resiliently biased to exert downward pressure preferably via holding pins on the carrier or holder, e.g., front curve, from which the lens is being removed to hold it in place against the vacuum force as the lens is being removed from the front curve mold The probe is then relocated over the carrier or package into which the lens is to be deposited. In a preferred mode, once the lens is lifted by the probe out of the front curve mold, the vacuum is shut off, with the lens being held by surface tension while the probe is relocated over the carrier or package. Alternatively, the vacuum force supply can be shut off after the probe has been positioned over the carrier or package. Preferably, the hood is pressed against the carrier or package, holding it in place, and if a package, the hood is designed to protect the sealing area from splashing. Once in the proper location, one or more short, controlled pressure pulses of liquid or gas, preferably air, are supplied. At the same time, preferably a vacuum is applied within more than one passage designed within an opening from the hood assembly. As a result, the contact lens is ejected from the probe into the package by at least one pressure pulse, and any residual washing solution or other material on the lens or packaging which is displaced from the contact lens by the pressure pulse(s) or movement of the lens off the probe is drawn into the passage of the hood by the vacuum. This results in rapid placement of the contact lens into the final package without excess matter on the lens or the package. The vacuum draws away any excess matter which becomes airborne during the ejecting step, and preferably the vacuum also removes any matter in the heat seal area of the package to provide for successful package closure.

Presence of the lens during transfer can be detected by measurement of the vacuum that is achieved. A low vacuum indicates that there is no lens carried by the probe.

In one respect, the invention provides a method for transferring a wet object from a first position to a second position. The method includes the steps of picking up an object from a first position with a nozzle, ejecting the object from the nozzle with a pressurized fluid to a second position, and drawing away any excess matter from the object which becomes airborne during the ejecting step. In a preferred mode, the drawing step commences before the ejecting step with the excess matter being drawn away from and external to the nozzle. The method may further include the step of providing a coating material to the object during the transfer process, with excess coating material being drawn away the same as any other excess matter. The object being transferred can be relocated to a different position by moving the nozzle after it is picked up, or the object can be relocated by moving a new container, for example, product packaging, under the nozzle while the nozzle remains stationary.

In another respect, the method of the invention transfers a wet object from a first container to a second container. This process includes the steps of locating a probe having a nozzle adjacent the object in the first container, creating a vacuum in the nozzle to draw the object to the nozzle, deactivating the vacuum, providing a pressurized fluid in the nozzle to release the object and to displace any excess matter from the object, and creating a vacuum within a hood disposed about the nozzle to draw away the any excess matter.

According to another aspect of the invention, an apparatus for transferring a wet object from a first station to a second station is disclosed. The apparatus includes a probe having a reciprocating barrel with a passage for communication with a positively or negatively pressurized fluid. A nozzle is affixed at one end of the probe for transferring the wet object from the first station to the second station, the nozzle being in communication with the passage. A variety of nozzles of different sizes and shapes can be affixed to the probe. A hood is disposed about the nozzle and is connectable to a vacuum source. Upon application of the pressurized fluid, e.g. gas or liquid, the wet object is released from the nozzle, thereby causing excess matter to be ejected from the wet object which is drawn away within the hood. In a preferred form, the hood includes spacers which depend therefrom and space the hood from the station that it contacts, for example, a front curve mold for a contact lens or a contact lens package. The spacers limit movement of the hood and ensure that an inflow passageway is available to cause air to rush over the station (e.g., the seal area of a package) and thereby dry the area surrounding the hood or maintain that area dry during the transfer of the wet object. The apparatus may further include a controller programmed to control the vacuum connection to the hood and the application of pressurized fluid to the probe, and control the movement of the assembly.

OBJECTS OF THE INVENTION

It is therefore an object of the invention to provide a method and apparatus for transferring wet flexible objects, such as contact lenses, from one station to another.

Another object is to provide a method and apparatus for pickup and transfer of wet flexible molded parts and removing the liquid and other matter, particularly from the surface of the molded parts, during the transfer.

An additional object is to provide a method and apparatus for transferring a wet object, such as a contact lens, from one station to another which uses a probe to remove the lens from the first station by vacuum pressure and transfer it to the second station where it is deposited by applying a pressurized stream or pulse of air or liquid through the probe to the object.

A further object is to provide a probe to transfer a wet lens from one position to another and to remove excess liquid or other matter from the lens surface during the transfer.

Yet a further object is to provide a method and apparatus for transferring a wet object which prevents contamination of the heat seal area of the package. In this design, the hood fits over the package to prevent contamination of the heat seal area.

Another object is to provide a probe which has a hood which prevents the pickup of the containers at the first and second stations.

BRIEF DESCRIPTION OF THE DRAWINGS

Other objects and advantages of the present invention will become apparent upon reference to the following specification and annexed drawings in which:

FIG. 1A is an elevational, cross-sectional view showing a lens being picked up by a probe;

FIG. 1B is an elevational, cross-sectional view of the probe shown depositing the lens into a package;

DETAILED DESCRIPTION OF THE INVENTION

Figure 4:
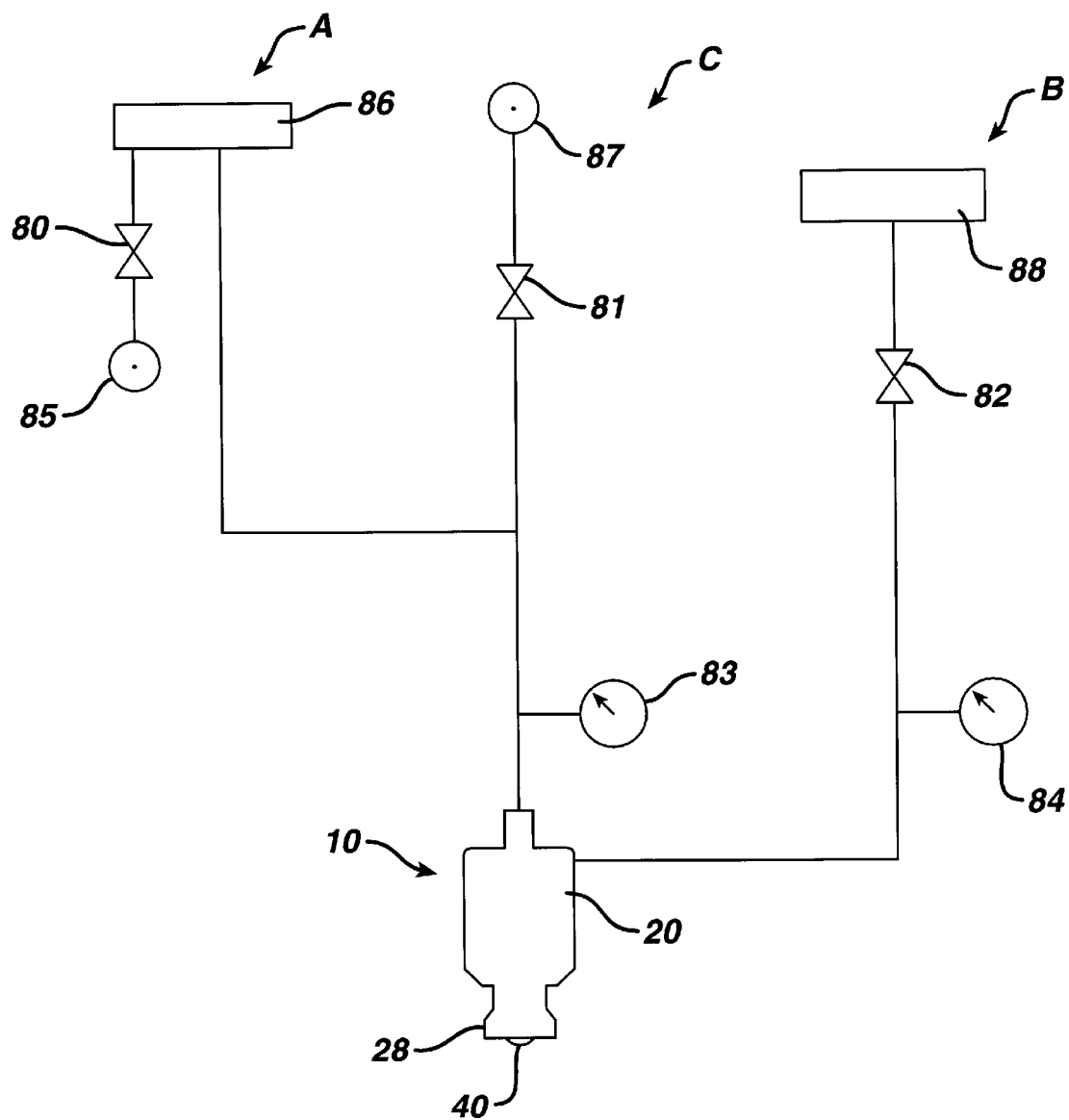
FIG. 4 is a schematic diagram of a system in accordance with the invention.

Referring to the drawings, in the preferred embodiment, the probe 10 has a tubular barrel 12 having a central passage 14 which is controllably connected to sources of a vacuum A and compressed gas C, such as air (see FIG. 4). The probe is of any suitable material, for example, a high density, polyetheretherketone (PEEK). The probe barrel 12 is spring loaded by spring 35. The probe barrel 12 is controllably driven by a suitable mechanism, such as a pneumatic or electromagnetic driven piston, to move it laterally and/or to reciprocate it up and down. Once the probe contacts a contact lens, any additional downward movement of the probe causes the spring 35 to compress until the probe assembly is moved back up (reciprocated). The probe is preferably resiliently biased when it contacts a contact lens. The barrel 12 is surrounded by and slides in a sleeve 31 whose lower enlarged end defines a hood 28, which surrounds the lower end of the barrel 12. The barrel 12 and sleeve 31 reciprocate in a stationary mounting block 20.

The hood 28 defines a passage 30 for a vacuum. The hood 28 is connected to a vacuum B. The hood 28 surrounds the sides of the nozzle 40 attached to the lower end of the probe 10. The hood 28 and sleeve 31 are spring loaded by a spring 16 within a casing 17. The casing 17 preferably provides equal distribution of the vacuum within the hood and around the probe 10. The spring's 16 upper end engages the mounting block 20, and its lower end engages a seat 19 on of the hood 28. As the probe barrel 12 moves down under control of the external mechanism, the hood 28 also moves with it by the action of the spring load provided by spring 16. There are opposing stops 29a on the hood sleeve and 12a on the barrel to limit motion of the two relative to each other.

Figure 2A:
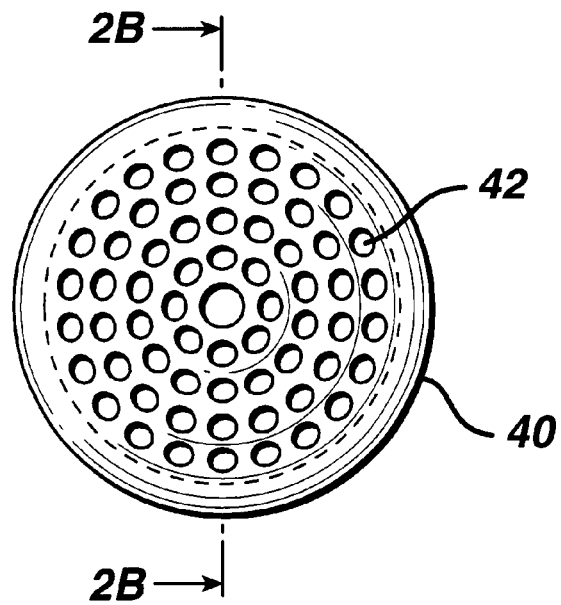
FIG. 2A is a front view of the front end of the probe nozzle.
Figure 2B:
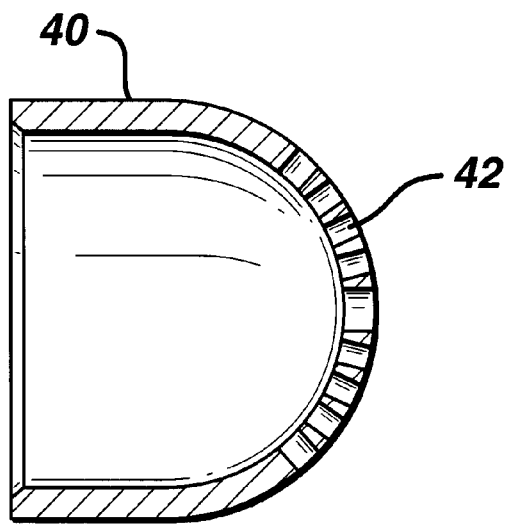
FIG. 2B is a cross-sectional view of the probe nozzle of FIG. 2A.

The nozzle 40 at the lower end of the probe barrel 12 is in communication with the central passage 14. As shown in FIGS. 2A and 2B, the nozzle 40 is of generally semi-spherical shape (although other shapes can be provided) and has a plurality of perforations 42, preferably 0.28 mm to 0.41 mm in diameter, and more preferably closer to about 0.41 mm in diameter. The nozzle perforations 42 preferably are arranged in concentric rings, as shown in FIG. 2A, over the entire nozzle surface area including having holes which permit the vacuum to engage the edges of the lenses 52 for optimum pick-up. The nozzle 40 preferably is of a hard material. It is of a size and shape to generally conform to the object to be transferred, here the inner concave surface of the lens. The nozzle may be made interchangeable so as to accommodate objects of different sizes and shapes. Generally the nozzle is about 12 to 15 mm in diameter, depending on the size of the object, e.g. lens, being transferred. Vacuum is achieved or compressed air is supplied through the perforations 42 in the nozzle 40 via the barrel 12 and the central passage 14.

In alternative embodiments, the hood 28 can be used with the nozzles described in the aforementioned U.S. Pat. Nos. 5,561,970 and 5,706,634.

The probe 10 is to transfer a wet object from a first station to a second station. Here, illustratively, the object is a wet, hydrogel contact lens 52. In FIG. 1A, the lens 52 is shown in a concave mold 50, called the front curve in the manufacture of contact lenses. The mold 50 can be of plastic or of a reusable mold material, e.g. quartz. The mold 50 also can represent a tray or other type of holder to hold the lens while being subjected to a hydration bath or other processing stage. The hydration bath also can be carried out while the lens is in the mold.

The wet lens 52 is to be removed from the mold 50 and transferred to a second station, which in FIG. 1B is a package 60 having a well 62 into which the lens 52 is to be placed, or deposited. This can be the final package which is to be opened by a consumer. The package well 62 has a surrounding lip 63 which defines the heat-seal area of the package. Also, before, during and/or after the deposition of the lens into the package well 62, liquid and/or other residual material on the contact lens and/or within the package can be removed in a controlled and repeatable manner by the lens transfer device of this invention.

To remove the lens 52 from the mold 50, the probe barrel 12 is preferably moved in register with the lens 52, and downwardly moved to preferably contact the lens 52, and to slightly compress the spring 35. At this time, the vacuum is applied through the barrel central passage 14 to pick up the lens from the mold 50 to be engaged against the nozzle 40. The pickup vacuum pressure can be in the range of about 0.06 to 0.15 bar, for example. At this time, the hood 28 is positioned above the front curve mold 50. Preferably, the hood 28 is resiliently biased by spring 19 against the front curve mold, and pins or spacers 70 on the hood 28 engage the front curve mold 50 to prevent the mold from being picked up by the suction from the nozzle 40 as it picks up the lens 52, and as the barrel 12 with the attached lens 52 is raised by the external mechanism. In an alternative embodiment, the vacuum(s) within the barrel 12 and/or hood 28 can be used to remove all of the liquid from the first station from which the lens is removed. In particular, in a process in which the front curve molds 50 are reused for subsequent lenses, the vacuum assists in preparing such molds for reuse by withdrawing all of the liquid.

The addition of Tween 80, polysorbate 80NF, manufactured by ICI Specialty Chemicals, at 10 to 100 ppm, and preferably 20–30 ppm to the last liquid the contact lens contacts prior to transfer using the nozzle of this invention, may improve lens transfer performance. Other surfactants or other processing agents can be added to the liquid.

The wet lens 52 has now been removed from the first station and is to be deposited into the package well 62. Either the mounting block 20 with the probe 10 is moved over the package 60, or the package is moved under the probe. This is accomplished by any conventional mechanism.

Figure 3:
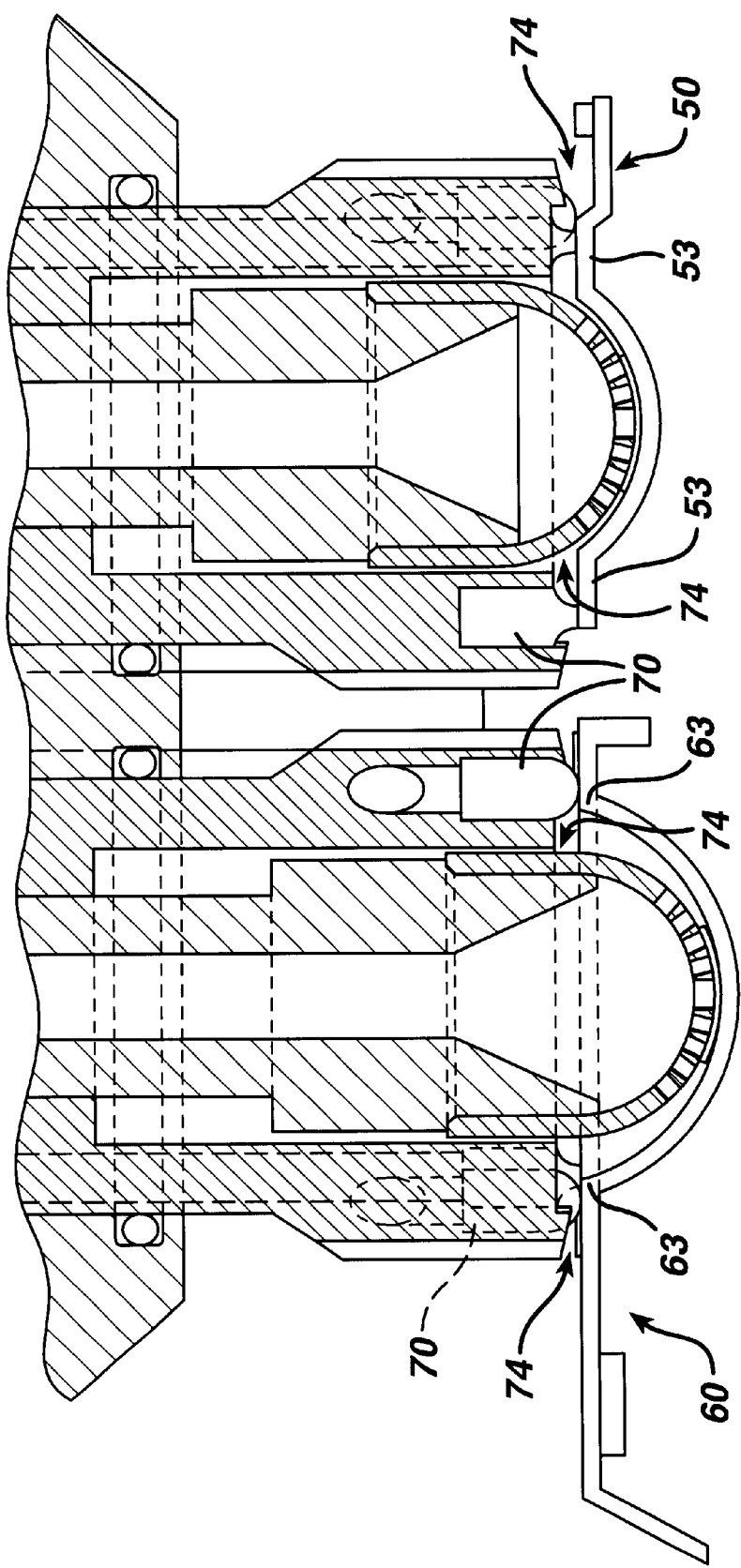
FIG. 3 is a detailed view of FIGS. 1A and 1B.

The nozzle barrel 12 is moved downwardly onto the package 60 and is stopped when the nozzle with the lens and the package are at a fixed distance apart, preferably, defining a gap of 0.3–0.7 mm, and more preferably a gap of approximately 0.5 mm between the nozzle and the bottom of the package well 62. The lower end of the hood 28 is resiliently biased against the package positioned by the stop pins or spacers 70, as shown in FIG. 3, which also provides a space between the lower end of the hood and the package lip 63. The stop pins 70 fix the distance between the nozzle 40 and the bottom of the package well 62 (FIG. 1B) and the mold 50 (FIG. 1A).

At this stage, the vacuum flow in probe passage 14 is stopped, if not stopped earlier. Preferably, compressed gas is then blown, for example, as one or a series of several jets or pulses, through the probe central passage 14. The jets or pulses may range in duration from 0.3 to 2.5 seconds, preferably 0.3 to 0.7 seconds, with a 0.5 second off-time therebetween, and may be pulsed one to three times, for example. The pressurized pulses can be, for example, 20 lb/in$^2$ to 1.5 bar. In and around this time, including shortly before and shortly after, a vacuum is drawn around the perimeter of the probe barel 12 through the hood 28 within the passage 30. Preferably, the vacuum is drawn in the passage 30 before the vacuum in the passage 14 is stopped, and more preferably, just before the vacuum is stopped, for example, 0.5 second before. The vacuum within the passage 30 can be, for example, 0.12 to 0.20 bar. The compressed air drives the lens 52 off of the nozzle 40 into the package well 62. It also drives liquid, and any other material, from the lens surface, and the vacuum drawn through the hood passage 30 captures this blown off material. Preferably, the strength of the vacuum in the passage 30, under the hood 28, is greater than that of the jets or pulses conveyed through the nozzle 40 from the passage 14. Because the hood and the package lip 63 are spaced from one another by the stop-pins 70 with inflow passageways 74 therebetween, the vacuum in the passage 30 not only draws liquid from the lens 52, it also draws air across the package lip 63 or seal area of the package through the inflow passageways 74 and into the passage 30 to dry or maintain this area dry to better ensure that the package 60 is effectively heat sealed with a lidstock, if this is needed. Importantly, the lens is not drawn into the passage 30, partially due to the in-rush of air or other ambient gas from outside the hood 28 and the package 60 through the inflow passageways 74, and also due to the pulses/stream of positive pressure applied to the lens from the passage 14. Preferably, after the transfer is complete, the well is filled with a buffered solution, such as saline, before the package is sealed.

Preferably, the hood 28 has a circumferential size which generally matches the well in the package 60 and the lip 53 around the concave mold 50. When sized in this way, the stop pins 70 will readily engage the heat-seal area 63 of the package 60 and the lip 53 of the mold 50, yet permit an in-rush of air through the inflow passageways 74 between the pins 70. The hood is designed to prevent contamination of the heat-seal area of the package, by making the circumference of the hood substantially match the shape of the heat-seal area of the package.

In an alternative embodiment, the front curve mold 50 can be sucked clear of its contents, the lens 24 transferred, and the mold cleaned (e.g., by injecting mold cleaning solution delivered by the nozzle or other device, with the solution removed simultaneously). The vacuum established within the passage 30 and compressed gas pulses from passage 40 can then be used to dry and clean the front curve mold 50 once the lens has been transferred.

FIG. 4 is a schematic diagram of the air/gas control system for the probe/hood assembly. These are two vacuum sources A, and B and one compressed gas source C. Vacuum source A and compressed gas source C communicate with the probe central passage 14, either to apply suction or gas pressure. Vacuum source B comprises a high-mass regenerative blower 88, which applies a vacuum to the hood 28 through passage 30. Vacuum source A is controlled by a two-way valve 80 which regulates the compressed air source 85 feeding the vacuum ejector 86. Alternatively, an alternate source of vacuum could be used, e.g. a regenerative blower. Compressed gas C is provided by a compressed air source 87 controlled by a two-way valve 81. The vacuum in the hood 28 is controlled by a two-way valve 82. A Programmable Logic Controller (PLC) can control each valve and the assembly movement in a properly timed sequence as described previously. Two gauges monitor pressures applied to passages 14 and 30 of the probe 10/hood 28 assembly. Gauge 83 monitors both pressure and vacuum that is applied to the wet lens 52, preferably supplying feedback to the PLC. Gauge 84 monitors vacuum to the hood, preferably supplying feedback to the PLC. Gauge 83 has the capability of monitoring the system to determine if a lens 52 is present on the nozzle 40 of the probe.

The PLC can be programmed in a conventional manner to control and ensure that the process is operating within prescribed parameters and that the valves and vacuum/pressure sources are operating correctly. Operation outside of the range of prescribed parameters can be noted by the PLC to identify one or more lenses 52, molds 50, or trays 20 to be marked for removal.

A mechanical, electrical or computer operated controller controls valves 80, 81 and 82, as well as an electromagnetic, cam, or pneumatic driver (not shown) that reciprocates the probe. The controller is programmed to perform the operation described above in the properly timed sequence.

The pressurized fluid can be air, an inert gas, a buffered saline solution or distilled water as a liquid or vapor, and may include a coating material for the surface of the contact lens, for example, a coating material which makes the lens more hydrophilic. In one embodiment, such coating can be added to the lens as an aerosol spray or part of a liquid which emanates from the nozzle 40 with a gas during release of the lens from the probe 10. Alternatively, the coating or another additive can be added as part of a separate processing step, for example, after the lens has been placed in the package 60.

The lens transfer method and apparatus of the invention works effectively over a wide range of lens designs, including monofocal, multifocal, and toric lenses. In addition, the lens transfer method and apparatus of the invention provide a highly efficient controlled method over previous techniques with the ability to successfully transfer up to and exceeding 99% of the contact lenses.

All patents, applications, publications, and the method mentioned herein are hereby incorporated by reference.

As used herein, the term "excess matter" refers to any foreign matter or material which has not been prescribed or specified for a particular object such as a contact lens or contact lens package. For example, "excess matter" in the case of a hydrogel contact lens having a hydrophilic coating includes any water, saline solution, leachable diluent or processing chemical or the like which may be on the lens at a particular stage of processing.

Specific features of the invention are shown in one or more of the drawings for convenience only, as each feature may be combined with other features in accordance with the invention. Alternative embodiments will be recognized by those skilled in the art and are intended to be included within the scope of the claims.

What is claimed is:

1. A method for transferring an object from a first container to a second container, comprising:

(a) locating a probe having a nozzle adjacent said object in said first container;

(b) creating a vacuum in said nozzle to draw said object to said nozzle;

(c) deactivating said vacuum;

(d) providing a pressurized fluid in said nozzle to release said object therefrom and to displace excess matter from said object, whereby said object is transferred to said second container; and (e) creating a vacuum within a hood disposed about said nozzle to draw away said excess matter, wherein said hood is spaced from said second container to provide air flow when said vacuum in said hood is created.

2. The method of claim 1, wherein said object is a contact lens.

3. The method of claim 2, including the additional step of spacing said hood from said second container by about 0.3 mm to about 0.7 mm prior to step (e).

4. The method of claim 1, including the additional step of positioning said nozzle from being adjacent said object in said first container to being adjacent said second container prior to step (d).

5. The method of claim 1, wherein said object is a contact lens and said first container is a front curve mold, said second container is a package for a contact lens, and said hood is spaced from said package to provide air flow across said package when said vacuum is created.

6. The method of claim 1, wherein said object is a contact lens and said first container is a reusable mold.

7. The method of claim 2, including the additional step, prior to step (b), of providing a fluid containing a surfactant in said first container.

8. The method of claim 2 further comprising the additional step after said locating step of:

resiliently biasing said nozzle against said object.

9. The method of claim 2 further comprising the additional step before said providing step of:
   resiliently biasing said hood against said second container.

10. Apparatus for transferring an object from a first station to a second station comprising:
   a) a probe having a passage for communication with a pressurized fluid;
   b) a nozzle at one end of said probe for picking up and transferring said object from said first station to said second station, said nozzle being in communication with said passage;
   c) a hood disposed about the nozzle, said hood being connectable to a vacuum source, wherein when said nozzle transfers said object to said second station, between said hood and said second station is defined at least one opening for air flow;
   whereby application of said pressurized fluid releases said object from said nozzle thereby causing excess matter to be ejected from said object, said excess matter being drawn away within said hood by said vacuum.

11. Apparatus as in claim 10, wherein said hood is movable and includes at least one spacer which depends therefrom and engages the first and second stations to thereby limit movement of the hood.

12. Apparatus as in claim 10, further comprising a controller which is programmed to control the vacuum connection to said hood and the application of pressurized fluid to said probe.

13. Apparatus as in claim 10, further comprising a passage for communication with a vacuum source in said probe.

14. Apparatus as in claim 10, wherein said fluid is a gas.

15. Apparatus as in claim 10, wherein said hood is resiliently biased when said hood contacts the first and second stations.

16. The method of claim 11, wherein said creating a vacuum within a hood step commences prior to said providing step.

17. The method of claim 11, wherein said hood comprises spacers which contact said second container during said creating a vacuum within a hood step.

18. The method of claim 2, wherein said first container is a mold half.

19. Apparatus for transferring an object from a first station to a second station comprising:
   a) a probe having a passage for communication with a pressurized fluid;
   b) a nozzle at one end of said probe for picking up and transferring said object from said first station to said second station, said nozzle being in communication with said passage;
   c) a hood disposed about the nozzle, said hood being connectable to a vacuum source, wherein when said nozzle transfers said object to said second station, between said hood and said second station is defined at least one opening for air flow;
   whereby application of said pressurized fluid releases said object from said nozzle thereby causing excess matter to be ejected, said excess matter being drawn away within said hood by said vacuum.

* * * * *